US011990066B2

(12) United States Patent
Feit et al.

(10) Patent No.: US 11,990,066 B2
(45) Date of Patent: May 21, 2024

(54) SYSTEM AND METHOD TO ADJUST INCLINED HEADS-UP DISPLAY PERSPECTIVE

(71) Applicant: Honda Motor Co., Ltd., Tokyo (JP)

(72) Inventors: Steven Feit, Dublin, OH (US); Charles S. Haase, Delaware, OH (US); Andrew R. Hoover, West Liberty, OH (US); Samuel J. Melton, Columbus, OH (US); Takuya Kimura, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 89 days.

(21) Appl. No.: 17/698,957

(22) Filed: Mar. 18, 2022

(65) Prior Publication Data
US 2023/0298491 A1    Sep. 21, 2023

(51) Int. Cl.
*G09G 3/00* (2006.01)
*G06F 3/01* (2006.01)
*G06T 17/00* (2006.01)
*G06V 20/56* (2022.01)

(52) U.S. Cl.
CPC ............. *G09G 3/002* (2013.01); *G06F 3/013* (2013.01); *G06T 17/00* (2013.01); *G06V 20/588* (2022.01); *G09G 2340/04* (2013.01); *G09G 2380/10* (2013.01)

(58) Field of Classification Search
CPC ............... G09G 3/002; G09G 2340/04; G09G 2380/10; G06F 3/013; G06T 17/00; G06V 20/588
See application file for complete search history.

(56) References Cited

U.S. PATENT DOCUMENTS

| 9,207,770 | B2 | 12/2015 | Liao et al. |
| 9,581,457 | B1 | 2/2017 | Meredith et al. |
| 10,274,726 | B2 | 4/2019 | Dickerson et al. |
| 10,302,953 | B2 | 5/2019 | Oliveira et al. |

(Continued)

FOREIGN PATENT DOCUMENTS

| CN | 108459520 A | 8/2018 |
| CN | 111016785 A | 4/2020 |

(Continued)

*Primary Examiner* — Chong Wu
(74) *Attorney, Agent, or Firm* — RANKIN, HILL & CLARK LLP

(57) ABSTRACT

A heads-up display system for a vehicle includes a display area on a surface of the vehicle and an optical projection unit for projecting graphic elements to the display area. An electronic control unit is operatively connected for computer communication to the optical projection unit. The electronic control unit determines a perspective view of a real road scene from a user while the user views the real road scene through the display area based on a ride height of the vehicle and an eyepoint of the user. The electronic control unit identifies road features that are visible to the user in the perspective view of the real road scene and adjusts a virtual image having inclined content based on the road features so that the inclined content substantially matches the perspective of the real road scene. Further, the electronic control unit controls the optical projection unit to project the virtual image to the display area.

20 Claims, 5 Drawing Sheets

(56) References Cited

U.S. PATENT DOCUMENTS

| | | | |
|---|---|---|---|
| 11,467,415 B1* | 10/2022 | Chang | G09G 3/002 |
| 2008/0165084 A1* | 7/2008 | Giegold | G06T 5/006 |
| | | | 345/7 |
| 2020/0241293 A1 | 7/2020 | Wang et al. | |
| 2021/0271079 A1 | 9/2021 | Yoneda et al. | |

FOREIGN PATENT DOCUMENTS

| | | |
|---|---|---|
| CN | 111267616 A | 6/2020 |
| CN | 112053445 A | 12/2020 |
| CN | 112114427 A | 12/2020 |
| CN | 112428936 A | 3/2021 |
| CN | 113190802 A | 7/2021 |
| GB | 2419118 A | 4/2006 |
| WO | WO2017134861 A1 | 8/2017 |
| WO | WO2021228112 A1 | 11/2021 |

\* cited by examiner

SYSTEM AND METHOD TO ADJUST INCLINED HEADS-UP DISPLAY PERSPECTIVE

BACKGROUND

Many vehicles include a heads-up display (HUD) to present virtual information in an augmented reality manner to driver's view. For example, a HUD may present augmented-reality (AR) content onto the windshield of a vehicle so as to present the information in a driver's view while the driver is driving. In some vehicles, the HUD includes inclined HUD operational parameters to project information in a parallax-like manner. More specifically, the HUD projects information in a manner where the information appears to lean away from the driver as the driver's eyes move from the bottom of the windshield to the top of the windshield. This type of inclined HUD gives a driver a more realistic perception of depth when viewing AR content with real world elements.

It can be difficult to implement an inclined HUD because of the following vehicle variations: vehicle ride height, driver height, driver eyepoint. These vehicle variations are dynamic and can be affected by different factors. For example, automatic ride height functions can dynamically adjust the ride height of a vehicle. Different seat settings/positions and a driver's own posture and position can affect driver eyepoint. Further, HUD position and rotation can affect the alignment of the inclined content to the outside environment (e.g., road). Accordingly, methods and systems that understand the dynamic nature of these variations and factors to allow for adjustments of the inclined content are desired.

BRIEF DESCRIPTION

According to one aspect, a heads-up display system for a vehicle includes a display area on a surface of the vehicle and an optical projection unit for projecting graphic elements to the display area. An electronic control unit is operatively connected for computer communication to the optical projection unit. The electronic control unit determines a perspective view of a real road scene as viewed by a user through the display area based on a ride height of the vehicle and an eyepoint of the user. The electronic control unit identifies road features that are visible to the user in the perspective view of the real road scene and adjusts a virtual image having inclined content based on the road features so that the inclined content substantially matches the perspective of the real road scene. Further, the electronic control unit controls the optical projection unit to project the virtual image to the display area.

According to another aspect, a computer-implemented method for operating a heads-up display (HUD) of a vehicle includes determining a perspective view of a real road as viewed by a user through the display area based on a ride height of the vehicle and an eyepoint of the user. The perspective view is based on a ride height of the vehicle and an eyepoint of the user. The method also includes identifying road features that are visible to the user in the perspective view of the real road scene. Further, the method includes adjusting a virtual image having inclined content based on the road features so that the inclined content substantially matches the perspective of the real road scene. The method includes controlling the optical projection unit to project the virtual image to the display area.

According to a further aspect, a non-transitory computer-readable storage medium storing computer-readable instructions includes instructions for determining a perspective view of a real road scene from a user while the user views the real road scene through a display area. The perspective view is based on a ride height of a vehicle and an eyepoint of the user. The instructions also include identifying road features that are visible to the user in the perspective view of the real road scene. The instructions further include generating a virtual image having inclined content based on the road features so that the inclined content substantially matches the perspective of the real road scene. Further the instructions include rendering the virtual image to the display area. Other embodiments of the aspects discussed above can include corresponding computer systems, apparatus, and computer programs recorded on one or more computer storage devices, each configured to perform the actions of the methods.

BRIEF DESCRIPTION OF THE DRAWINGS

The accompanying drawings, which are incorporated in and constitute a part of the specification, illustrate various systems, methods, devices, and other embodiments of the disclosure. It will be appreciated that the illustrated element boundaries (e.g., boxes, groups of boxes, directional lines, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Figure 1:
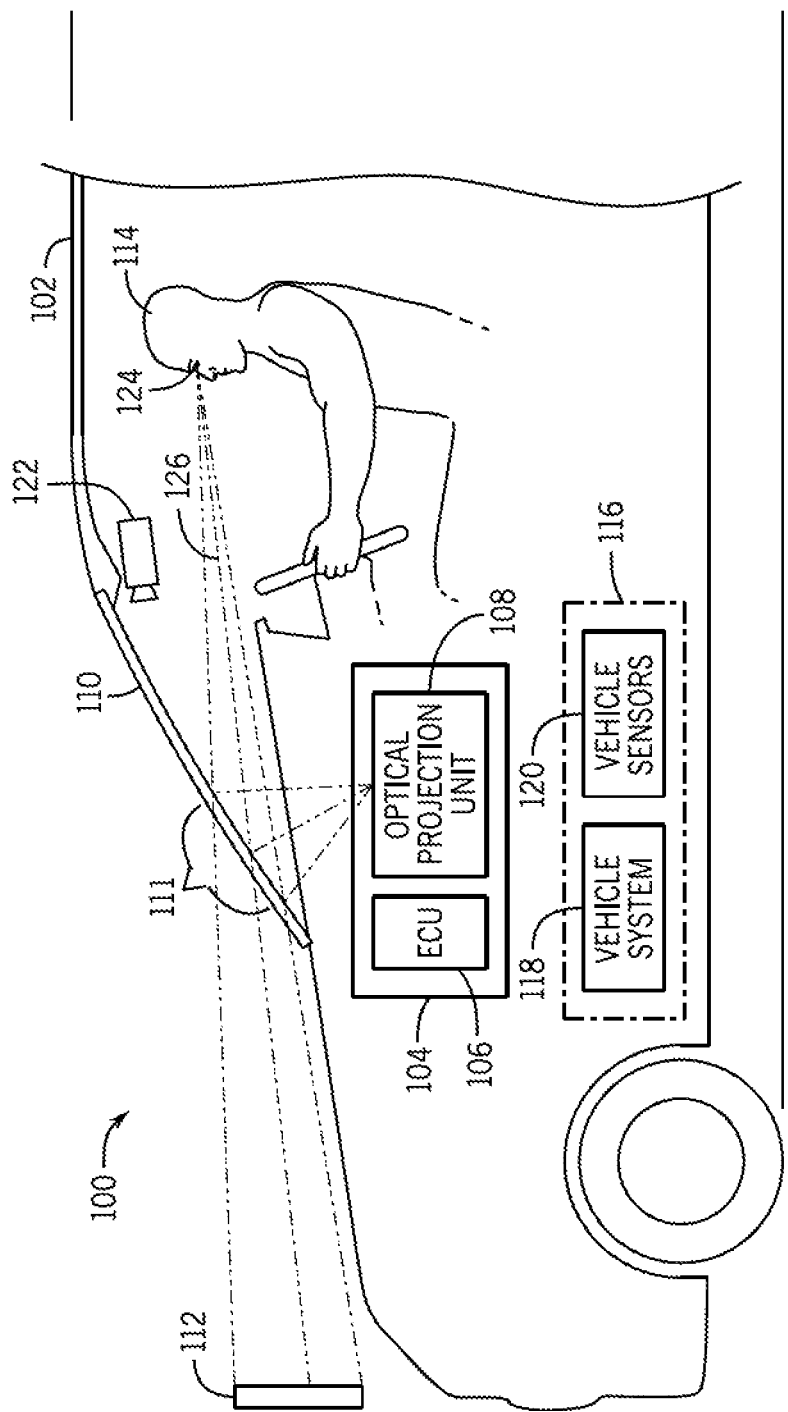
FIG. 1 is a schematic diagram illustrating a heads-up display system according to one exemplary embodiment.

The methods and system described herein consider different variations in the context of a vehicle to dynamically adjust content projected by a HUD and thereby match a perspective of the content to a perspective of a real-world environment (e.g., the road) viewed through the HUD. This technique results in a realistic perception of depth and allows the driver to more easily focus on the road. Referring now to the drawings, wherein the showings are for purposes of illustrating one or more exemplary embodiments and not for purposes of limiting same, FIG. 1 is a schematic diagram illustrating an exemplary system 100 for operating a heads-up display system for a vehicle 102 according to one embodiment. The vehicle 102 includes a heads-up display (HUD) system 104 including an electronic control unit (ECU) 106, an optical projection unit (OPU) 108, and a display area 111. The ECU 106 may include logic circuitry with hardware, firmware, and software architecture frameworks for facilitating the alteration and/or generation of virtual images as discussed herein as well as for controlling the OPU 108. In some embodiments, the ECU 106 may store application frameworks, kernels, libraries, drivers, application program interfaces, among others, to execute and control hardware and functions discussed herein. It is understood that although not shown in FIG. 1, the ECU 106 can include a memory and/or a data storage device.

The OPU 108 projects graphic elements (e.g., virtual images, augmented reality elements) to the display area 111 in view of a user 114 while the user 114 views an environment through the display area 111. In the example shown in FIG. 1, the display area 111 is located on a surface of the vehicle 102, namely, a windshield 110. The HUD 104 via the OPU 108 projects a virtual image 112 through the windshield 110 at the display area 111 so that the user 114 can view the virtual image 112 while viewing an environment surrounding the vehicle 102 (e.g., a road) through the windshield 110. The virtual image 112 and the environment surrounding the vehicle 102 will be discussed in further detail herein. It is understood that although not shown in FIG. 1, the HUD 104 can include other components, for example, a combiner, a mirror, among others.

The vehicle 102 can also include other vehicle components, for example, vehicle components 116 that include at least vehicle systems 118 and vehicle sensors 120. It is appreciated that the vehicle 102 can include other components not shown in FIG. 1. It is also appreciated that the vehicle 102 can include a processing unit (not shown) include provisions for processing, communicating and interacting with various components of the system 100. In some embodiments, this processing unit can perform the same and/or similar functions as described herein with the ECU 106.

The vehicle systems 118 can include any type of vehicle system described herein to enhance the vehicle 102 and/or driving of the vehicle 102. Although not shown in FIG. 1, in some embodiments, the vehicle systems 118 include a position determination system (e.g., GPS, navigation systems) and/or a height adjustable suspension system. The vehicle sensors 120, which can be integrated with the vehicle systems 118, can include various types of sensors for use with the vehicle 102 and/or the vehicle systems 118 for detecting and/or sensing a parameter of the vehicle 102, the vehicle systems 118, and/or the environment surrounding the vehicle 102. For example, the vehicle sensors 120 can capture data about a road in a real world scene (e.g., in the environment surrounding the vehicle). This data can include road geometry, lane geometry, lane markings, lane measurements, road surface information, among others. In some embodiments, the vehicle systems 118 can include map data (e.g., maps, map models) that include the same or similar data.

In one embodiment, the vehicle sensors 120 include an imaging sensor 122. The imaging sensor 122 can be used to capture images inside the vehicle 102 and/or images of the environment surrounding the vehicle 102. In one embodiment, imaging sensor 122 is an eye tracking camera system that can capture eye gaze tracking, eye blinking, eye movement, among others. In some embodiments, the imaging sensor 122 captures data about a line-of-sight 126 of the user 114. Line-of-sight data can include information about a head pose of the user 114, a body position of the user 114, a posture of the user 114, an eye gaze of the user 114, an eyepoint 124 of the user 114, among others.

Figure 2:
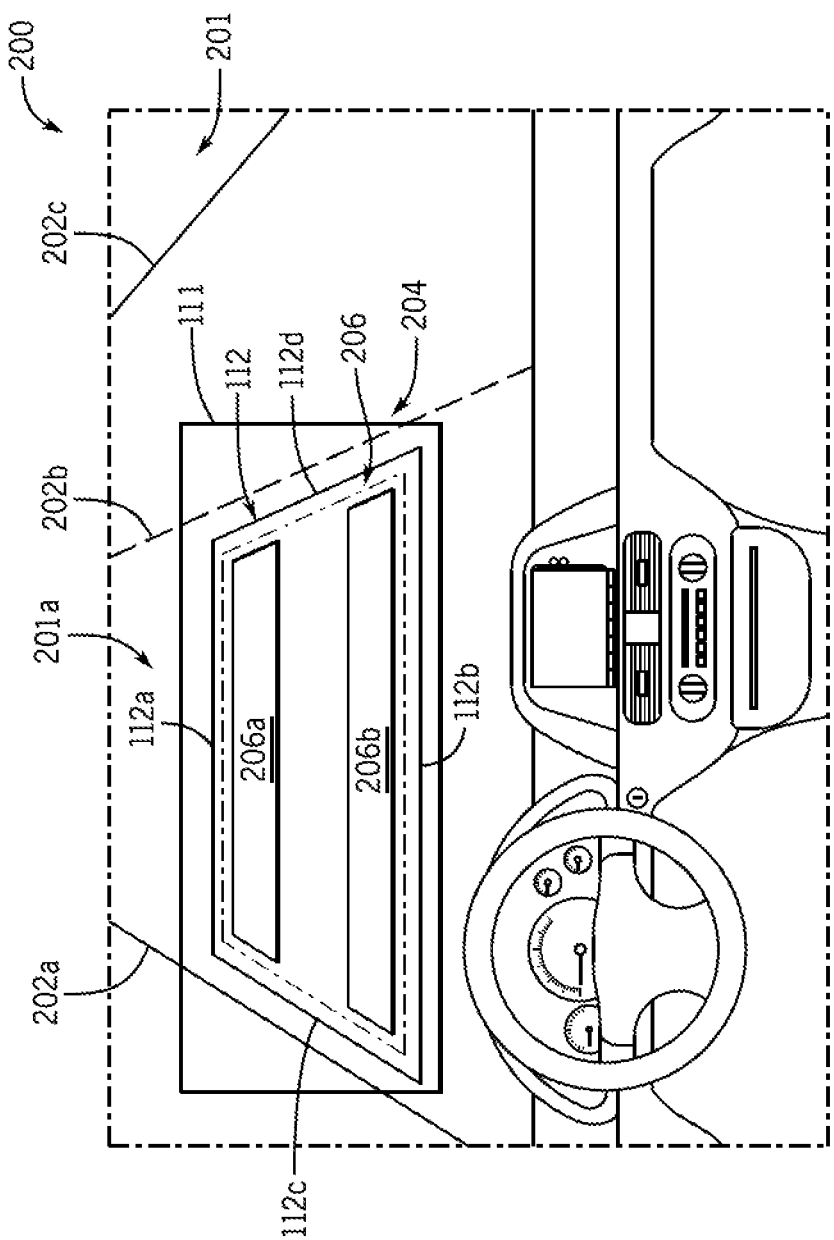
FIG. 2 is a schematic diagram illustrating the heads-up display system of FIG. 1 as seen from an interior of a vehicle according to one exemplary embodiment.

When the user 114 looks forward along the line-of-sight 126 from the eyepoint 124, the user 114 can visually recognize the virtual image 112 as displayed by the HUD 104 through the display area 111. As will be discussed in further detail with FIG. 1, the virtual image 112 is displayed in such a manner that it is superimposed on a real world scene (e.g., a road in the environment surrounding the vehicle). Referring now to FIG. 2, a schematic diagram of an interior view 200 is shown according to one exemplary embodiment. FIG. 2 will be described with reference to FIG. 1. The interior view 200 is a perspective view looking from an interior of the vehicle 102 and through the windshield 110. The interior view 200 includes a real road scene 201 as seen through the windshield 110 that is visually recognized by the user 114. In general, the real road scene 201 includes elements of an environment surrounding the vehicle 102, including, for example, a road segment 201a. The real road scene 201 also includes one or more road features that are identified and/or extracted for use in adjusting virtual content so that the virtual content substantially matches the real road scene 201. The one or more road features can include visual markers in the real road scene 201 and/or measurements about the real road scene 201.

In one embodiment, the one or more road features include lane markers, a vehicle path, and/or road surface dimensions and measurements. For example, in FIG. 2, for example, a first road feature 202a represents a left lane marker, a second road feature 202b represents a center lane marker, and a third road feature 202c represents a right lane marker. In some embodiments, these road features are extracted and/or determined from imaging data and/or map data. For example, if lane markers are not visually present in the real road scene 201, the lane markers and/or a vehicle path can be determined based on tire tracks, a preceding vehicle, or other road features. In some embodiments discussed herein, the one or more road features include road surface dimensions and measurements about, for example, the road segment 201a. For example, slope, curvature, angle, pitch, roll, elevation, surface friction, conditions (e.g., snow, rain) and other road profile characteristics. In some embodiments, these road features are extracted and/or determined from imaging data and/or map data.

Referring again to FIG. 2, within the interior view 200, the display area 111 is shown, where the HUD 104 can present content to the user 114. The content and the portions of the real road scene 201 viewable by the user 114 within the display area 111 will be referred to as a perspective view 204. More specifically, the perspective view 204 is a view of the real road scene 201 from the user 114 according to the line-of-sight 126 starting from the eyepoint 124. Within the perspective view 204 is the virtual image 112. In FIG. 2, the virtual image 112 has a first side 112a, a second side 112b, a third side 112c, and a fourth side 112d. The virtual image 112 in FIG. 2 includes inclined content 206. The inclined content 206 can include one or more graphic elements that are positioned to match a depth of the real road scene 201. For example, in FIG. 2, a far content 206a is positioned at a top (e.g., top position) of the virtual image 112 and a close content 206b is positioned at a bottom (e.g., bottom position) of the virtual image 112. The inclined content 206 appears to lean away from the user 114 as the eyepoint 124 of the user 114 moves from the close content 206b to the far content 206a.

Figure 3A:
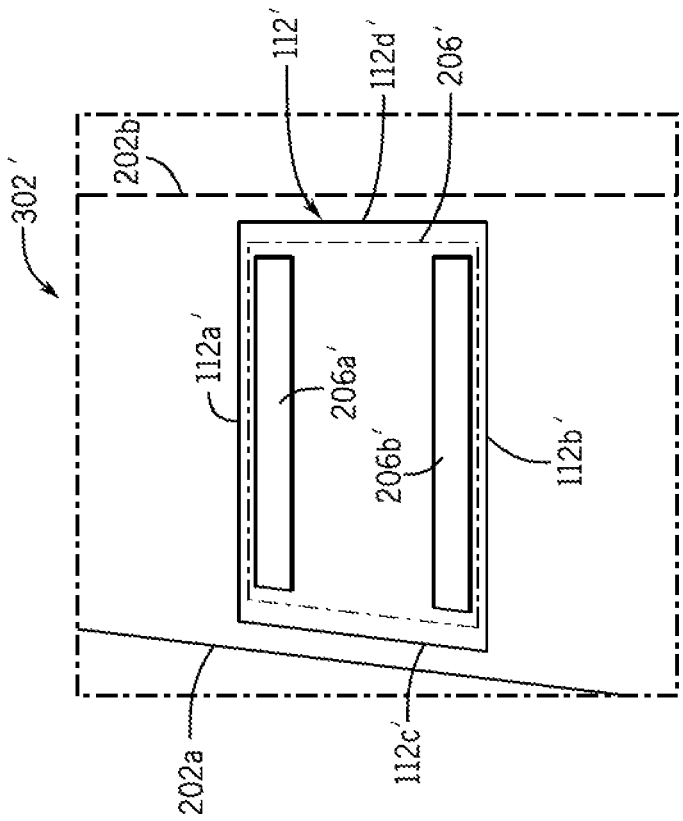
FIG. 3A is a schematic diagram of the perspective view shown in FIG. 2.
Figure 3B:
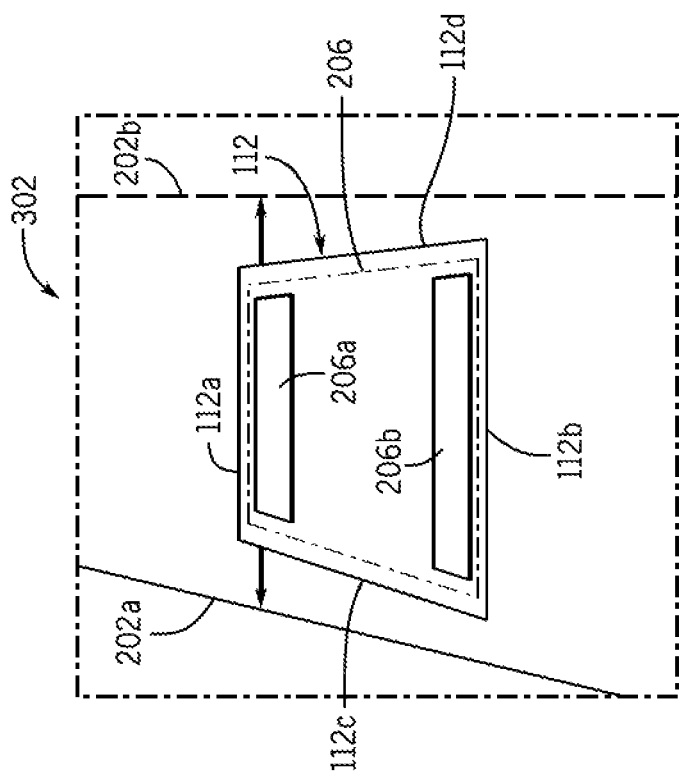
FIG. 3B is a schematic diagram of the perspective view of FIG. 3A adjusted based on road features according to an exemplary embodiment.
Figure 4:
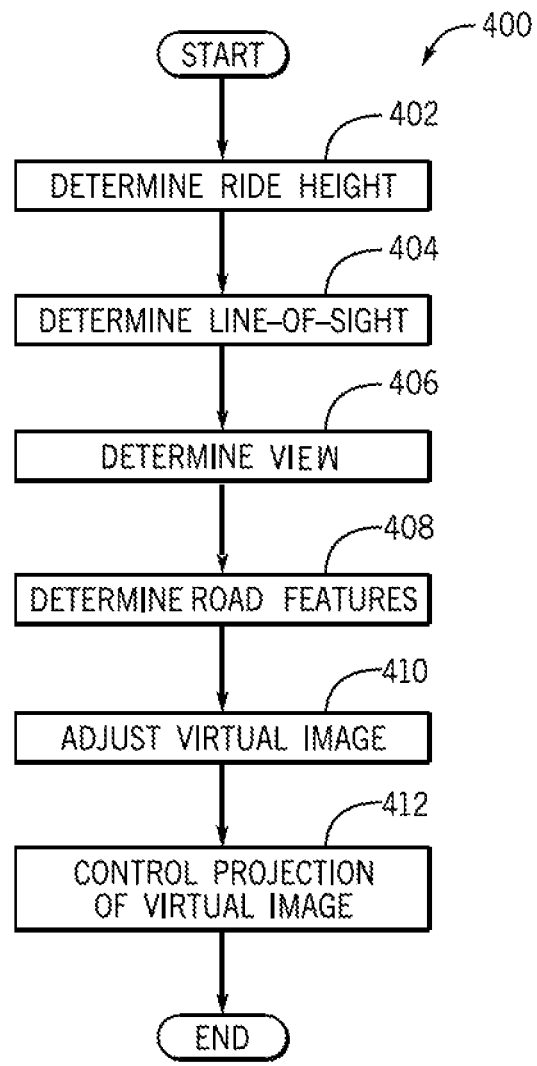
FIG. 4 is a flow diagram of a method for operating a heads-up display of a vehicle according to one exemplary embodiment.

In the context of vehicles and driving, depth perception of the virtual image 112 with respect to the real road scene 201 is important. The inclined content 206 presents a challenge to accurate depth perception for virtual reality and a driver's distance estimation to road features in the real road scene 201. FIG. 3A is a simplified view 302 of the perspective view 204 of FIG. 2. As suggested by the arrows, the virtual image 112 can be adjusted so that the inclined content substantially matches the perspective of the real road scene 202. This results in the perspective view 302' of FIG. 3B. This illustrative example will now be described in more detail with respect to FIG. 4, an exemplary method 400 for operating the HUD 104 of the vehicle 102 according to one exemplary embodiment.

As briefly mentioned above, there are various vehicle variations that can affect alignment of virtual information projected by a HUD. For example, vehicle ride height, driver height, and driver eyepoint. The systems and methods discussed herein acquire data to determine and fully understand vehicle ride height, driver height, and driver eyepoint. Accordingly, at block 402, the method 400 includes determining a ride height of the vehicle 102. Ride height is an amount of space between the base of a tire and the lowest point of the vehicle. Different types of vehicles have different ride heights. For example, a sedan can have a ride height of 6.5 inches, while an SUV can have a ride height of 8.9 inches. Some vehicles have suspension systems with a height adjustable suspension feature. This allows for manual and/or automatic varying of the vehicles ride height. For example, if a vehicle is travelling over rough terrain, it may be advantageous to increase the ride height allowing the vehicle better road clearance over the rough terrain. Accordingly, to determine the ride height of the vehicle 102 different data about the vehicle 102 and/or the surrounding environment of the vehicle 102 must be considered.

It is understood that data for determining the ride height can include any data obtained from the components shown in FIG. 1 (e.g., the HUD 104, the vehicle systems 118 and/or the vehicle sensors 120). Additionally, in some embodiments, this data can be obtained from storage devices located at the vehicle 102 and/or located remotely from the vehicle 102. For example, in some embodiments, the vehicle 102 is equipped for computer communication to remote servers and/or other vehicles. With this in mind and with reference again to block 402, in one embodiment, the method 400 includes the ECU 106 receiving vehicle specifications from the vehicle 102 and determining the ride-height of the vehicle 102 based on the vehicle specifications.

In a further embodiment, the method 400 includes the ECU 106 receiving standard driver height measurements and determining the ride-height of the vehicle 102 based on the vehicle specifications and the standard driver height measurements. Standard vehicle specifications and standard driver height measurement can be stored at the vehicle 102 and/or retrieved from a remote server (not shown) (e.g., an Original Equipment Manufacturer server). In one embodiment, an actual driver height measurement of the user 114 can be received, for example, from a portable device (not shown). In another embodiment, the ECU 106 can determine the ride height based on operating parameters captured from a suspension system of the vehicle 102 (i.e., the vehicle systems 118, the vehicle sensors 120). For example, if the suspension system has an automatic adjustable suspension, the ride height can be determined from ride height operating parameters.

In a further embodiment, the ECU 106 can determine an expected ride height of the vehicle 102 for the road segment 201a based on a change in one or more road features of the road surface. Said differently, the ECU 106 can predict a ride height of the vehicle 102 based on an upcoming segment of a road ahead of the vehicle 102. In some embodiments, the ECU 106 determines an expected ride height of the vehicle 102 based on road surface features of an upcoming segment of a road ahead of the vehicle 102 and/or operating parameters of an automatic adjustable suspension.

Referring again to FIG. 4, at block 404, the method 400 includes determining a line-of-sight of the user 114. For example, the ECU 106 can determine the line-of-sight 126 based on eye tracking data from a from a driver monitoring camera (e.g., the image sensor 122) including the eyepoint 124 of the user 114. Accordingly, in one embodiment, block 404 includes the ECU 106 capturing an image of the user 114 using vehicle sensors 120 and determining the eyepoint 124 of the user 114 based on the image of the user 114. In some embodiments, the line-of-sight of the user 114 is also determined and/or adjusted according to the ride height determined at block 402.

At block 406, the method 400 includes determining a perspective view of the real road scene 201. As mentioned above, FIG. 3A is a simplified perspective view 302 of the perspective view 204 of FIG. 2. Thus, the perspective view 302 is a perspective view of the real road scene 201 as seen from the user 114 while the user 114 views the real road scene 201 through the display area 111. This perspective view 302 is based on the ride height of the vehicle 102 and the eyepoint of the user 114. The perspective view 302 shows the virtual image 112 in its original state, while the perspective view 302' shows the virtual image 112' as adjusted to match the one or more road features.

At block 408, the method 400 includes identifying road features of the real road scene 201 visible to the user 114 in the perspective view 302 of the real road scene 201. As discussed above in detail, the road features can include visual markers in the real road scene 201 and/or measurements about the real road scene 201. In one embodiment, the ECU 106 utilizes image recognition and landmark extraction techniques to identify road features. In some embodiments, map data (e.g., from a position determination unit) can be utilized to identify the road features and a location (e.g., coordinates) of the road features. As shown in FIG. 3A, the road features include the first road feature 202a and the second road feature 202b. It is also appreciated that the road features can include road surface measurements that are not shown in FIG. 3A. For example, one or more road features can include road surface dimensions and measurements about, for example, the road segment 201a. For example, slope, curvature, angle, pitch, roll, elevation, surface friction, conditions (e.g., snow, rain) and other road profile characteristics.

At block 410, the method 400 includes adjusting a virtual image. More specifically, the ECU 106 adjusts the virtual image 112 having inclined content 206 based on the road features so that the inclined content 206 substantially matches the perspective of the real road scene 202. In one embodiment, the virtual image 112 and/or the inclined content 206 is adjusted according to an angle of the road segment 201a. Exemplary methods for adjusting and/or generating a virtual image according to block 410 will be discussed in further detail with respect to FIGS. 5A and 5B.

Figure 5A:
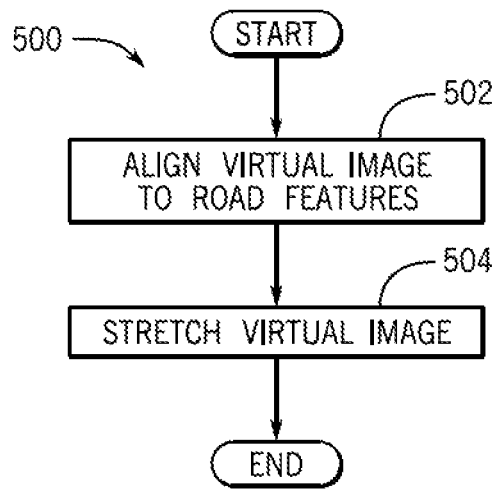
FIG. 5A is a flow diagram of a method for adjusting a virtual image according to one exemplary embodiment.

FIG. 5A is a method 500 for adjusting the virtual image 112 according to one exemplary embodiment. At block 502, the method 500 includes aligning the virtual image 112 to road features. For example, one or more portions and/or sides of a virtual image 112 can be aligned and/or scaled to match an alignment of one or more road features. In another embodiment, the virtual image 112 is adjusted to match a road angle of the road segment 201a. At block 504, the method 500 includes stretching the virtual image 112. For example, one or more portions and/or sides of the virtual image 112 can be scaled with respect to the road features. As an illustrative example, the ECU 106 can scale a width of one or more portions of the virtual image to match a width of a road in the real road scene 202, for example, the left lane marker 202a and the center lane marker 202b. This results in the perspective view 302' of FIG. 3B. It is understood that adjusting the virtual image 112 can include other methods of graphic manipulation. For example, in some embodiments, adjusting the virtual image 112 includes adjusting a transparency, a vanishing point, focal distance, motion, among other graphic properties according to the road features discussed herein.

Figure 5B:
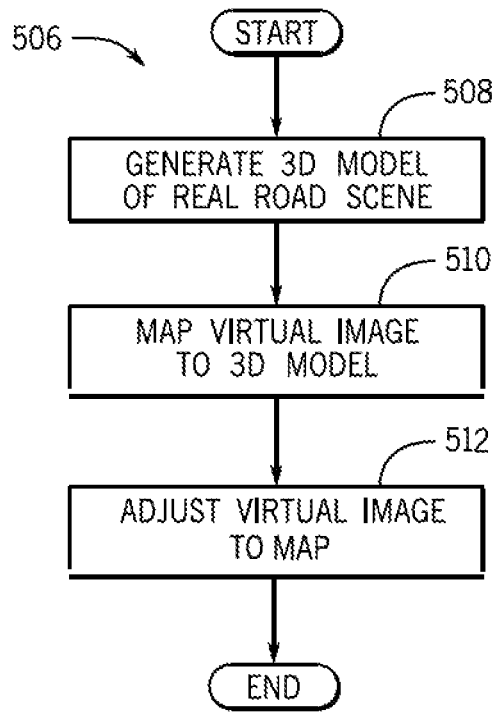
FIG. 5B is a flow diagram of a method for adjusting a virtual image according to another exemplary embodiment.

FIG. 5B illustrates another exemplary embodiment for adjusting a virtual image according to a method 506. This embodiment utilizes detailed map data stored, for example, at the vehicle 102. By utilizing this map data, less physical sensors on the exterior of the vehicle 102 are required. At block 508, the method 506 includes generating a three-dimensional (3D) model of the real road scene 202. In one embodiment, the ECU 106 generates the 3D model with position data received from the vehicle systems 118 and/or the vehicle sensors 120. In other embodiments, the 3D model is stored and retrieved from, for example, the vehicle 102. At block 510, the method 506 includes mapping the virtual image to a 3D model. Further, at block 512, the method 506 includes adjusting the virtual image 112 based on the mapping.

Once the virtual image is generated and/or adjusted, the method 400 continues at block 410, where the ECU 106 controls projection of the virtual image. Accordingly, by considering different variations in the context of the vehicle 102 to dynamically adjust content projected by the HUD 104, a perspective of the inclined content 206 is matched to the real-world environment thereby providing a realistic perception of depth.

Definitions

The following includes definitions of selected terms employed herein. The definitions include various examples and/or forms of components that fall within the scope of a term and that may be used for implementation. The examples are not intended to be limiting. Further, the components discussed herein, may be combined, omitted or organized with other components or into different architectures.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more computing devices (e.g., computer, personal digital assistant, cellular telephone, network device, vehicle, vehicle computing device, infrastructure device, roadside device) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Computer-readable medium," as used herein, refers to a non-transitory medium that stores instructions, algorithms, and/or data configured to perform one or more of the disclosed functions when executed. Computer-readable medium can be non-volatile, volatile, removable, and non-removable, media implemented in any method or technology for storage of information such as computer readable instructions, data structures, modules or other data. Computer-readable medium can include, but is not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can interface with. Computer-readable medium excludes transitory tangible media and propagated data signals.

"Portable device," as used herein, is a computing device typically having a display screen with user input (e.g., touch, keyboard) and a processor for computing. Portable devices include, but are not limited to, handheld devices, mobile devices, smart phones, laptops, tablets and e-readers.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms.

"Vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may carry one or more human occupants. Further, the term "vehicle" may include vehicles that are automated or non-automated with pre-determined paths or free-moving vehicles.

"Vehicle control system," and/or "vehicle system," as used herein may include, but is not limited to, any automatic or manual systems that may be used to enhance the vehicle, driving, and/or security. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

It will be appreciated that various embodiments of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A heads-up display system for a vehicle, comprising:
a display area on a surface of the vehicle;
an optical projection unit for projecting graphic elements to the display area; and
an electronic control unit operatively connected for computer communication to the optical projection unit, wherein the electronic control unit:
determines a perspective view of a real road scene as viewed by a user through the display area, wherein the perspective view is based on a ride height of the vehicle and an eyepoint of the user;
identifies road features of the real road scene visible to the user in the perspective view of the real road scene;
adjusts a virtual image having inclined content based on the road features so that the inclined content substantially matches the perspective view of the real road scene; and
controls the optical projection unit to project the virtual image to the display area.

2. The heads-up display system of claim 1, further including vehicle systems operatively connected for computer communication to the electronic control unit, wherein the electronic control unit receives the ride height of the vehicle and the eyepoint of the user from the vehicle systems.

3. The heads-up display system of claim 2, wherein the vehicle systems include vehicle sensors and the electronic control unit controls the vehicle sensors to capture an image of the user, wherein the electronic control unit determines the eyepoint of the user based on the image of the user.

4. The heads-up display system of claim 2, wherein the electronic control unit further adjusts the virtual image based on the ride height of the vehicle and the eyepoint of the user.

5. The heads-up display system of claim 1, wherein the road features include road surface dimensions and the electronic control unit further adjusts the virtual image by scaling a width of the virtual image based on the road surface dimensions.

6. The heads-up display system of claim 1, further including the electronic control unit generating a three-dimensional model of the real road scene and mapping the virtual image to the three-dimensional model.

7. The heads-up display system of claim 6, wherein adjusting the virtual image includes the electronic control unit adjusting a size of the virtual image based on the mapping.

8. The heads-up display system of claim 1, wherein the inclined content includes close content and far content and wherein the inclined content appears to lean away from the user as the eyepoint of the user moves from the close content to the far content.

9. A computer-implemented method for operating a heads-up display (HUD) of a vehicle, comprising:
determining a perspective view of a real road scene as viewed by a user through a display area, wherein the perspective view is based on a ride height of the vehicle and an eyepoint of the user;
identifying road features of the real road scene as viewed by the user in the perspective view of the real road scene;
adjusting a virtual image having inclined content based on the road features so that the inclined content substantially matches the perspective of the real road scene; and
controlling the HUD to project the virtual image to the display area.

10. The computer-implemented method of claim 9, further including capturing an image of the user using a vehicle sensor and determining the eyepoint of the user based on the image of the user.

11. The computer-implemented method of claim 9, including receiving vehicle specifications from the vehicle and determining the ride height of the vehicle based on the vehicle specifications.

12. The computer-implemented method of claim 9, wherein adjusting the virtual image includes aligning one or more sides of the virtual image to the road features.

13. The computer-implemented method of claim 9, further including generating a three-dimensional model of the real road scene and mapping the virtual image to the three-dimensional model.

14. The computer-implemented method of claim 13, wherein adjusting the virtual image includes unit adjusting a size of the virtual image based on the mapping.

15. The computer-implemented method of claim 9, wherein the inclined content includes a far content in a top portion of the virtual image and a close content in a bottom portion of the virtual image, wherein the inclined content appears to lean away from the user as the eyepoint of the user moves from the close content to the far content.

16. A non-transitory computer-readable storage medium storing computer-readable instructions, comprising:
instructions for determining a perspective view of a real road scene from a user while the user views the real road scene through a display area, wherein the perspective view is based on a ride height of a vehicle and an eyepoint of the user;
instructions for identifying road features of the real road scene that are visible to the user in the perspective view of the real road scene;

instructions for generating a virtual image having inclined content based on the road features so that the inclined content substantially matches the perspective of the real road scene; and instructions for rendering the virtual image to the display area.

17. The non-transitory computer-readable storage medium of claim 16, wherein the instructions for generating the virtual image includes selectively scaling one or more portions of the virtual image to match positions of the road features.

18. The non-transitory computer-readable storage medium of claim 16, wherein the instructions for generating the virtual image includes generating a three-dimensional model of the real road scene and mapping the virtual image to the three-dimensional model.

19. The non-transitory computer-readable storage medium of claim 18, wherein the instructions for generating the virtual image includes adjusting a size of the virtual image based on the mapping.

20. The non-transitory computer-readable storage medium of claim 16, wherein the inclined content includes close content and far content and wherein the inclined content appears to lean away from the user as the eyepoint of the user moves from the close content to the far content.

\* \* \* \* \*